United States Patent
Immaneni et al.

(10) Patent No.: US 12,034,615 B1
(45) Date of Patent: Jul. 9, 2024

(54) REAL TIME LOAD DISTRIBUTION FOR VEHICLE NETWORK LOGGER SYSTEM

(71) Applicant: GM Cruise Holdings LLC, San Francisco, CA (US)

(72) Inventors: Aditya Immaneni, Foster City, CA (US); Narayanan Vinay Krishnan, San Francisco, CA (US); Surbhi Singhal, Fremont, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 18/342,212

(22) Filed: Jun. 27, 2023

(51) Int. Cl.
  *H04L 43/04* (2022.01)
  *H04L 47/125* (2022.01)
  *H04L 67/12* (2022.01)

(52) U.S. Cl.
  CPC ............ *H04L 43/04* (2013.01); *H04L 47/125* (2013.01); *H04L 67/12* (2013.01)

(58) Field of Classification Search
  CPC ....... H04L 47/125; H04L 43/02; H04L 43/04; H04L 67/12
  See application file for complete search history.

(56) References Cited

U.S. PATENT DOCUMENTS

| | | | | |
|---|---|---|---|---|
| 10,635,108 | B2 * | 4/2020 | Liu | G05D 1/0088 |
| 11,809,395 | B1 * | 11/2023 | Fan | G06F 16/2228 |
| 2016/0300404 | A1 * | 10/2016 | Harter | G07C 5/008 |
| 2020/0409908 | A1 * | 12/2020 | Ahn | G06F 16/188 |
| 2021/0312724 | A1 * | 10/2021 | Petri | H04W 4/40 |
| 2021/0312729 | A1 * | 10/2021 | Smith | G07C 5/0841 |

* cited by examiner

*Primary Examiner* — Schquita D Goodwin
*Assistant Examiner* — Linh T. Nguyen

(57) ABSTRACT

A vehicle network logging system (VNLS) is described and includes an automated driving systems computer (ADSC) installed on the vehicle, the ADSC comprising a load balancing module; and at least one logger installed on the vehicle, wherein the at least one logger is connected to the ADSC via a communications network comprising a plurality of communications links and wherein the at least one logger receives from the ADSC data for logging in at least one database of the at least one logger, wherein the data is received from the ADSC via the plurality of communications links; wherein the load balancing module performs load balancing of the data across the plurality of communications links, wherein the load balancing is performed based at least in part on disk utilization information for the at least one logger and network utilization of the communications network.

20 Claims, 6 Drawing Sheets

REAL TIME LOAD DISTRIBUTION FOR VEHICLE NETWORK LOGGER SYSTEM

BACKGROUND

Technical Field

The present disclosure relates generally to autonomous vehicles (AVs) and, more specifically, to techniques for real time load distribution for a vehicle network logger system (VNLS) in connection with such AVs.

Introduction

An AV is a motorized vehicle that can navigate without a human driver. AVs include computers and control systems that perform driving and navigation tasks that are conventionally performed by a human driver. Such tasks require the collection and processing of large quantities of data using various sensors, including but not limited to, a camera sensor, a light detection and ranging (LIDAR) sensor, and a radio detection and ranging (RADAR) sensor, among others. The sensors collect data and measurements that the AV can use for operations such as navigation. The sensors can provide the data and measurements to an internal computing system of the AV, which can use the data and measurements to control a mechanical system of the AV, such as a vehicle propulsion system, a braking system, or a steering system. Typically, the sensors are mounted at fixed locations on the AVs.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Overview

Figure 1:
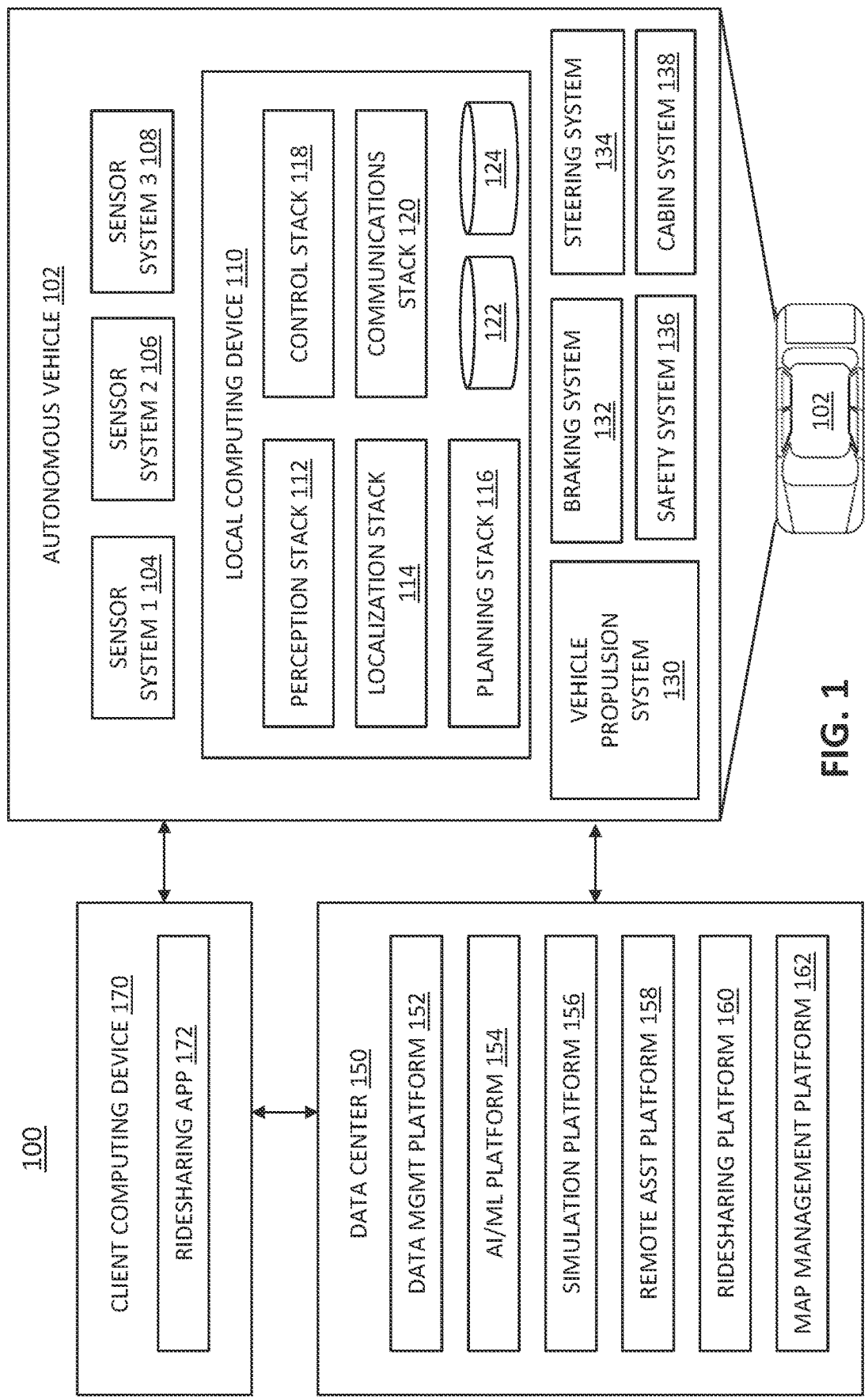
FIG. 1 illustrates an example system environment that can be used to facilitate AV (AV) dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Given the numerous advantages of ride hail, rideshare, and delivery services (hereinafter collectively referred to as rideshare services) provided by AVs, it is anticipated that AV provision of such services will soon become the ubiquitous choice for various user transportation and delivery needs, including but not limited to school commutes, airport transfers, long distance road trips, and grocery and restaurant deliveries, to name a few.

Throughout operation of an AV, various information in connection with the AV is logged by a vehicle network logger system (VNLS). In the context of AVs and as used herein, the term logger refers to an application that stores to persistent media relevant information about various hardware/software devices on AVs (often comprising a fleet of AVs) during operation of the AVs. This data is later uploaded to the cloud for parsing in order to understand what might have happened during a drive and/or recreate a drive in its entirety on equivalent hardware, for example. The saved data may include (1) all input information fed to an AV stack of an AV (for example, all sensor data), (2) the output of any non-deterministic calculations and (3) states of different software modules. The information may be used for a variety of purposes, including debugging of software modules, legal compliance, and performance improvements (especially with regard to the AV stack).

In particular embodiments, AV loggers log all necessary data for the entirety of a drive and store the data to disks, which are then offloaded when the AVs return to the garage. Moreover, as an AV fleet expands, the amount of data logged needs to be reduced to save on onboard hardware costs, offload times, and offload storage costs. Furthermore, as sensor traffic between AV automated driving systems computers (ADSCs) and a network switch increases, logging needs to be scaled accordingly.

In accordance with features of embodiments described herein, techniques for performing load balancing in a VNLS may be implemented and may include assessing network utilization, logger disk utilization, current data rates, and expected data rates, and performing load balancing across multiple transmission control protocol (TCP) links provided between an ADSC and one or more loggers of the VNLS.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110a-110e), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example AV Management System

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUS), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

AV 102 can also include several mechanical systems that can be used to maneuver or operate AV 102. For instance, the mechanical systems can include vehicle propulsion system 130, braking system 132, steering system 134, safety system 136, and cabin system 138, among other systems. Vehicle propulsion system 130 can include an electric motor, an internal combustion engine, or both. The braking system 132 can include an engine brake, a wheel braking system (e.g., a disc braking system that utilizes brake pads), hydraulics, actuators, and/or any other suitable componentry configured to assist in decelerating AV 102. The steering system 134 can include suitable componentry configured to control the direction of movement of the AV 102 during navigation. Safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, a High Definition (HD) geospatial database 122, and an AV operational database 124, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 can detect and classify objects and determine their current and predicted locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth.

Mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 122 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 116 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, DPVs, etc.), traffic rules and other safety standards or practices for the road, user input, and other relevant data for directing the AV 102 from one point to another. The planning stack 116 can determine multiple sets of one or more mechanical operations that the AV 102 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 can select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 can manage the operation of the vehicle propulsion system 130, the braking system 132, the steering system 134, the safety system 136, and the cabin system 138. The control stack 118 can receive sensor signals from the sensor systems 104-108 as well as communicate with other stacks or components of the local computing device 110 or a remote system (e.g., the data center 150) to effectuate operation of the AV 102. For example, the control stack 118 can implement the final path or actions from the multiple paths or actions provided by the planning stack 116. This can involve turning the routes and decisions from the planning stack 116 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 122 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108 and other components of the AV 102 and/or data received by the AV 102 from remote systems (e.g., the data center 150, the client computing device 170, etc.). In some embodiments, the raw AV data can include HD LIDAR point cloud data, image or video data, RADAR data, GPS data, and other sensor data that the data center 150 can use for creating or updating AV geospatial data.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes one or more of a data management platform 152, an Artificial Intelligence/Machine Learning (AI/ML) platform 154, a simulation platform 156, a remote assistance platform 158, a ridesharing platform 160, and a map management platform 162, among other systems.

Data management platform 152 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. The instructions may include remote assistance information comprising a response to a remote assistance request from the AV 102. In one example, the AV 102 may send a remote assistance request including one or more proposed operations, in which case remote assistance platform 158 response may include an indication of which operation(s) the AV is recommended to take. The response from remote assistance platform 158 may further include one or more proposed additional and/or alternative operations the AV 102 is recommended to take. In another example, remote assistance platform 158 response may indicate a level of caution recommended to be used by the AV 102 before executing operations based on a confidence level of a situation identified in the remote assistance request (e.g., the AV 102 is operating in an area of ongoing construction that has a low confidence level, in response to which remote assistance platform 158 may indicate that the AV 102 should proceed with a higher level of caution (e.g., reduced speed, no passing, etc.) determining operations). In still another example, the response from remote assistance platform 158 may indicate a range of speeds with which the AV 102 is recommended to operate and/or a focus region for the AV in a particular situation identified in the remote assistance request. In further examples, the response from remote assistance platform 158 may provide guidance with which the AV 102 may be able to derive its own operations. In some embodiments, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to be picked up or dropped off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as tracking specific changes that (human or machine) map editors have made to the data and reverting changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

Example System for Performing Selective Logging in a VNLS

Figure 2:
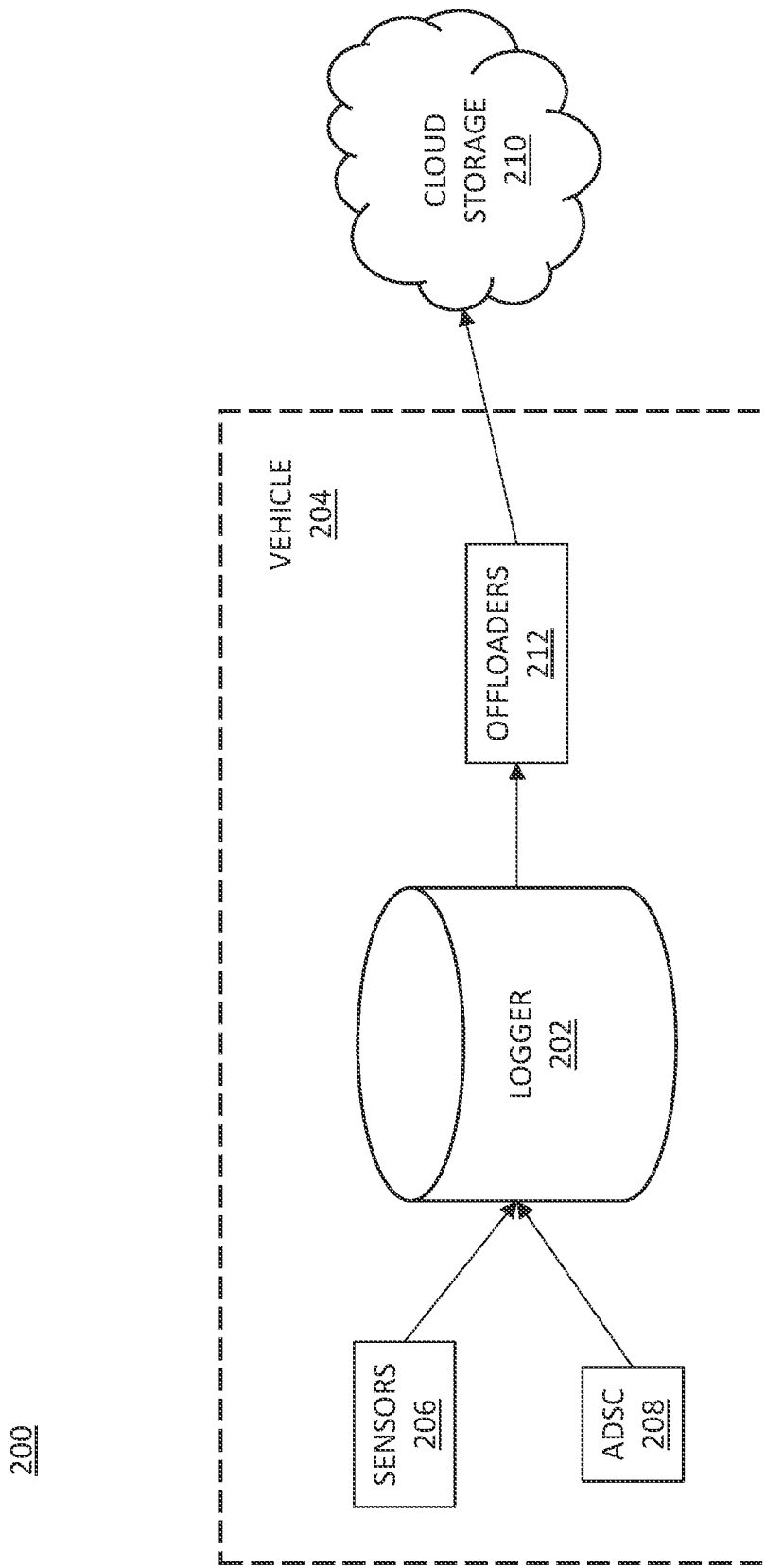
FIG. 2 illustrates a simplified block diagram of an example vehicle network logger system (VNLS) according to some aspects of the disclosed technology.

FIG. 2 illustrates a simplified diagram of an example system for performing selective logging in a VNLS in accordance with features of particular embodiments. As shown in FIG. 2, system 200 includes a logger 202 installed on a vehicle 204, which may be identical to AV 102 (FIG. 1). Logger 202 receives data from onboard sensors 206 and ADSC 208 and offloads data from the vehicle 204 to cloud storage 210 using offloaders 212, which may include one or more of cellular connections, WiFi connections, and disks. Offloaded data is uploaded from offloaders 210 to cloud storage 212 either manually (e.g., in the case of disks) or automatically (e.g., in the case of cellular and WiFi).

Figure 3:
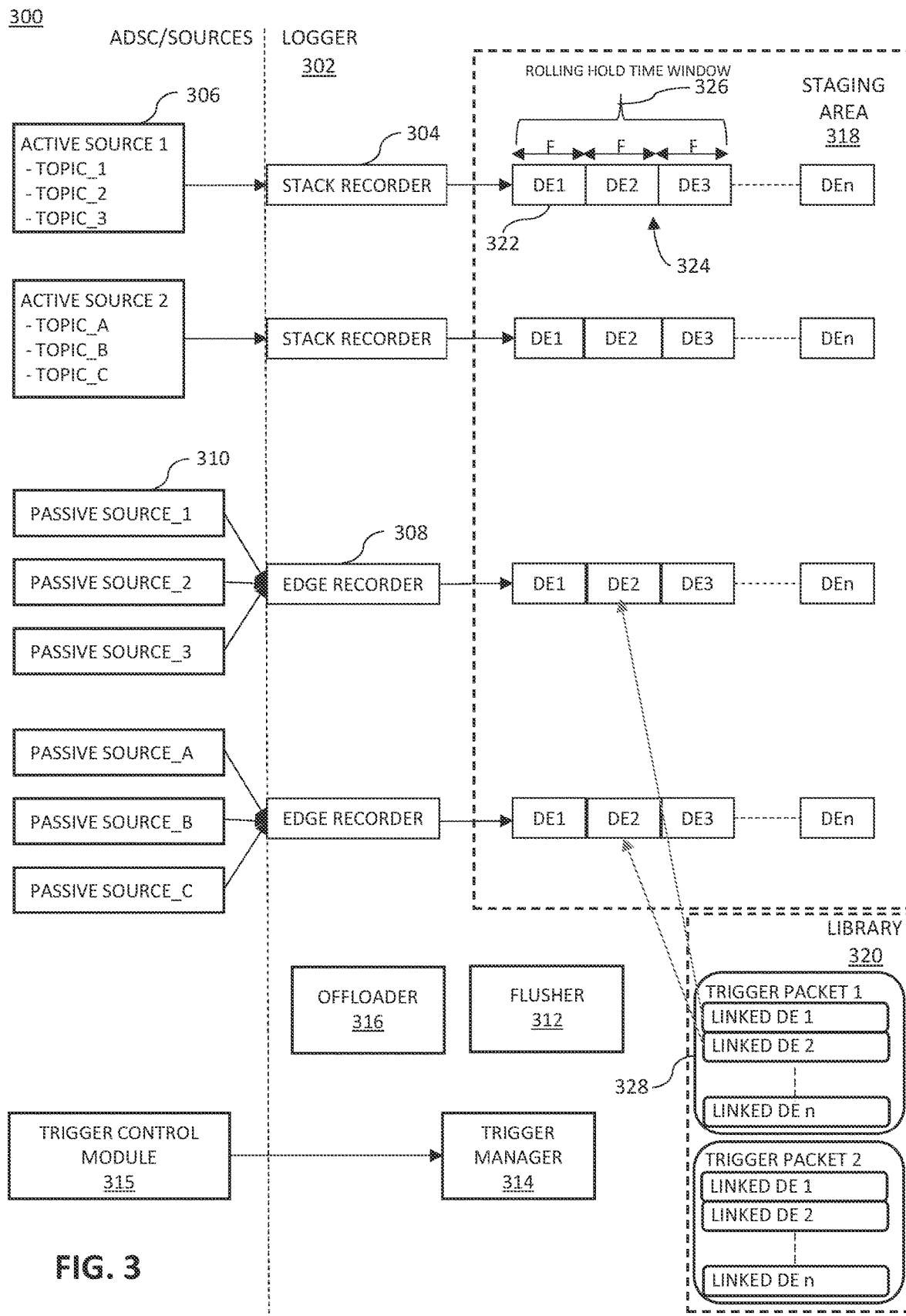
FIG. 3 illustrates a more detailed schematic block diagram of an example VNLS according to some aspects of the disclosed technology.

FIG. 3 is a more detailed schematic illustration of a VNLS 300 in accordance with features of embodiments described herein. As shown in FIG. 3, and as noted above, logger 302 includes stack recorders 304 for receiving data from active data sources 306 and edge recorders 308 for receiving data from passive data sources 310. Active data sources, or simply active sources, include sources that are aware of the existence of the logger and package data specifically for processing by the logger. Recorder nodes on the ADSC are examples of active sources. Passive data sources, or simply passive sources, include devices such as sensors that are unaware of the existence of logger 302. Edge recorders 308 listen to the data streams from passive sources 310 and package them accordingly.

In particular embodiments, logger 302 runs four modules, including recorders 304, 306, a flusher 312, a trigger manager 314 (which manages triggers on the logger side in response to triggers from a trigger control module 315 of ADSC), and an offloader 316. Additionally, logger 302 includes data storage generally comprising a staging area 318 and a library 320. Staging area may be implemented using RAM, hybrid RAM, or persistent memory (e.g., a solid-state drive (SSD)). Library may be implemented using SSD. Each recorder 304, 308, is a server that listens to and accepts data to be logged to a corresponding logstream in a single folder. Recorders may be one of two primary types, including stack recorders 304 and edge recorders 308. Stack recorders listen to data from active data sources 306, which may be driver nodes on the ADSC that transmit data from a stack launch to the logger. One stack recorder 304 only listens to data from one active data source 306 and each active data source may include multiple topics. Edge recorders 308 listen to passive data sources 310 and have a bit more responsibility for understanding traits of the passive sources and possibly parsing the data to weed out invalid data. One edge recorder 308 can listen to multiple passive sources 310. Edge recorders 308 can optionally record data from passive sources 310 even when the AV stack is not running by enabling a designated parameter in the edge recorder configuration.

Every active data source 306 must register itself with the logger 302 prior to sending data. When an active data source 306 registers itself, the logger 302 spawns a stack recorder 304 for the active data source. For passive data sources 310, the corresponding edge recorders 308 are created during startup from parsing the relevant configuration files.

Active data sources 306 package data into records, which are transmitted to the logger 302. An active source 306 can begin streaming to an already initialized logger 302 by registering itself as a client. To register itself as a client, the active source 306 needs to specify the set of topics it will transmit. The logger 302 prepares a staging area 318 for the active source 306.

Passive data sources 308 are edge devices. The logger 302 (and more specifically edge recorder 308) is responsible for transforming data from passive sources into a form appropriate for logging. Sensors, such as cameras, LIDARs, and RADARs are examples of passive sources. Data from multiple passive sources 310 is gathered by edge recorders 308 following configuration information provided during initialization. Data from each passive source 310 is labeled under a topic; topic names and passive sources have a one-to-one mapping. Any edge device that meets certain criteria can become a passive source 310 for the logger 302. Such criteria includes having a concept of a payload unit comprising a discrete unit of information with a start, an end, and a single timestamp associated with it (e.g., a jpeg frame, an H.265 P frame or I frame, or a LIDAR point cloud frame). Additionally, for sources for which the edge recorder performs data parsing, frames should arrive with a retrievable time stamp representing frame capture time. Finally, a source address:port should always map to one unique data source.

The staging area 318, or simply staging, is conceptually the primary data holding zone for the logger 302. Two modules modify the contents of the staging area, including the recorders 304, 308, and the flusher 314. As noted above, the role of the recorders 304, 308, is to accept data from various active and passive sources 306, 310, and write data to slices, or data elements, 322 comprising a rolling buffer, alternatively referred to as logstream 324. Each recorder is allocated a single logstream. A slice, or data element, may be a file on persistent media (such as an SSD), a RAM buffer, or a combination of both. The role of the flusher 312 is to delete data elements 322 that are outside of a rolling hold time window 326 and that have not been saved to the library 320. It will be noted that in particular implementations, as described herein, the flusher function 312 is incorporated into the recorders 304, 308.

A logstream, such as logstream 324, is a series of data elements 322 in which each element includes timestamped data received from one or more sources over a fixed time period F. In particular embodiments, each element will not have any data received prior to the timestamp in the name of the element or after the timestamp in the element+F. It will be noted that the creation of the data may have occurred prior to the timestamp, but receipt of the data will not have occurred prior to the timestamp. For example, in the case of camera data, the image might have been captured by the camera prior to the timestamp, but the image would have been received by the logger only after the timestamp.

As an example, if three consecutive files in the logstream for recorder designated "abc" are:
  Element P: abc_2021-03-27-23-50-12_1071
  Element Q: abc_2021-03-27-23-50-18_1072
  Element R: abc_2021-03-27-23-50-23_1073
And the time period F for each file is five seconds, then file P is guaranteed to only have records that were received on or after 2021-03-27-23-50-12 and before 2021-03-27-23-50-17. Similarly, file Q is guaranteed to only contain records received on or after 2021-03-27-23-50-18 and before 2021-03-27-23-50-23. In summary, for any source, the recorder creates a file with the present time in the timestamp, and as data arrives, the recorder appends to the file. After a fixed time period F, the recorder closes the data element and opens a new one with the current timestamp and the process continues. If for the duration of the time period no data is sent by the data source, an empty data element need not be created.

For each recorder, the logger creates a new folder with the recorder name and creates a file named [recordername]_connection_header.xxx with the connection headers of all topics to be expected by that recorder.

Referring again to FIG. 3, the library 320 is a database that holds snapshots, or trigger packets 328, related to the various triggers. A snapshot 328 is created whenever the logger 202 receives an event (e.g., at the trigger manager 314) related to a previously registered trigger. As described in greater detail below, the trigger system, which includes trigger control module 315 and trigger manager 314, generates snapshots 328 to be stored in the library.

The trigger system enables a user to indicate that a certain set of data (i.e., data from a certain set of topics) is of interest and needs to be saved around the time of an incident (referred to as an event). The logger 302 is a client of the trigger system and triggers are registered with the logger for it to map the triggers to its data elements and folders, which mapping is performed by the trigger manager 314. When an event related to a trigger occurs, a notification is sent from the trigger control module 315 to the logger 302 to cause the generation of a snapshot 328 related to the event, as described above.

Trigger registration can occur at any point during execution of the logger 302. It will be noted that if there are multiple loggers in a vehicle, duplicate versions of the trigger may be registered at each logger with the respective set of topics that each logger will receive. In this situation, a backend server will receive multiple snapshots related to the same event, which will need to be collated. Upon receiving a trigger registration, the logger 302 creates a mapping of the trigger to the logstreams 324 that include data related to the trigger. Note that since logstreams 324 are mapped to data sources 306, 310, that could publish multiple topics, a data element 322 of a logstream 324 might contain multiple topics, of which only a subset pertains to the trigger. This can be addressed during offload and/or by grouping topics appropriately. The sum of lookahead and lookbehind times ($T_H$) forms a rolling hold time window 326 for the trigger. The longest rolling hold time window for all triggers interested in (registered to) a logstream 324 is designated as rolling hold parameter for use by the flusher 312 to delete data elements 322 not referenced by a trigger packet 328.

After a trigger ID has been registered, at any point a client can send a trigger event notification that includes a trigger ID and an event timestamp. Upon receiving an event, the logger 302 creates a snapshot 328 saves it to the library 320. A snapshot is a database entry including a trigger ID, trigger priority, event timestamp, and on-disk data size of the snapshot. The snapshot 328 further includes a list of the following items for each data source:
  {datasource_metadata.json file link: {list of data files from that data source}}

Note that each logger on the vehicle that has the trigger ID registered must be provided in the trigger event notification. The data size of the snapshot 328 is used to calculate the approximate impact of the trigger event. Given that there can be multiple events that link to the same data element, it is not guaranteed that removal of a snapshot will decrease the disk usage by that amount.

Example System for Performing Load Balancing in a VNLS

Figure 4:
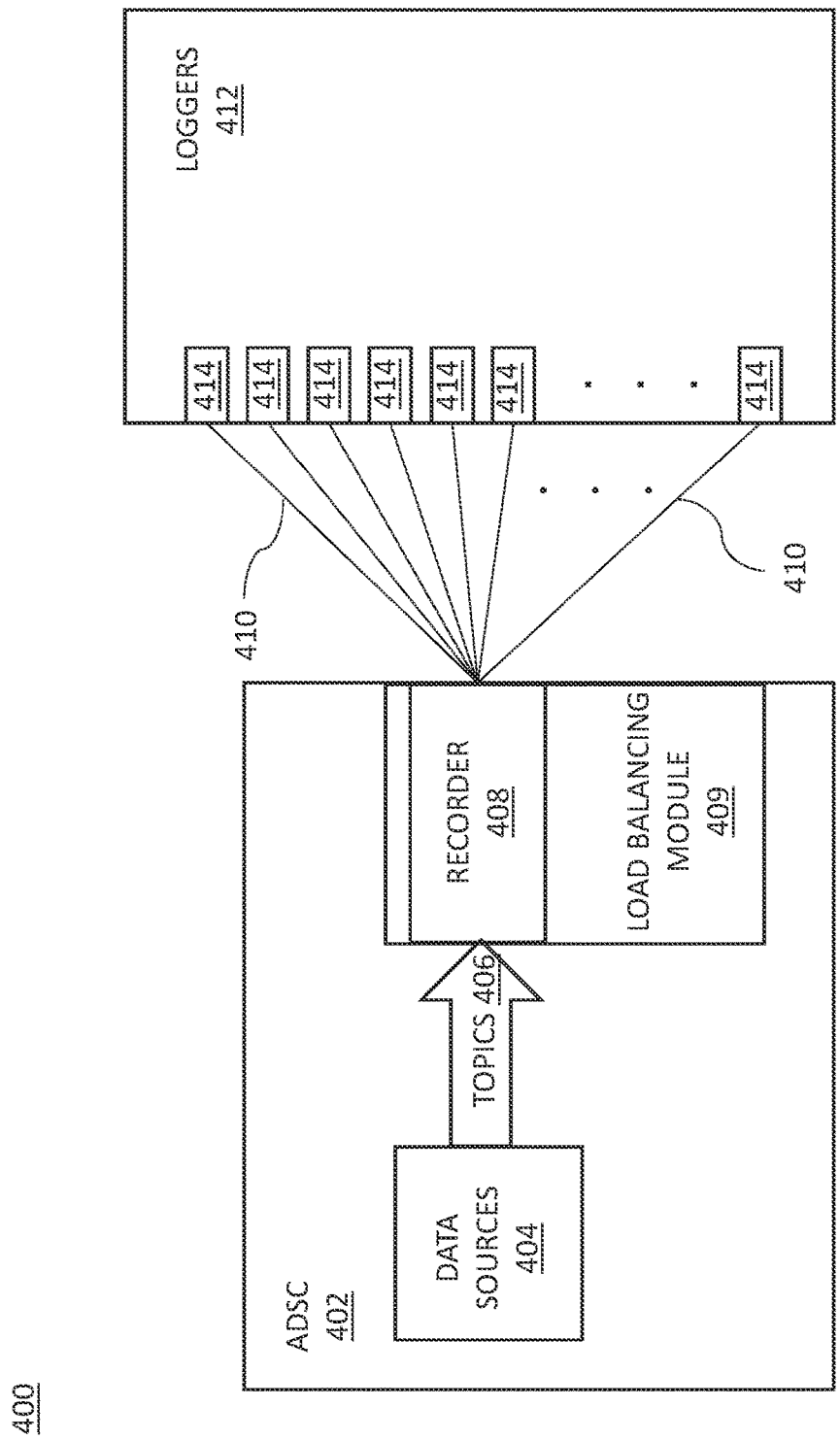
FIG. 4 illustrates a simplified block diagram of an alternative embodiment of an example VNLS including one or more loggers according to some aspects of the disclosed technology for performing load balancing in the VNLS.

FIG. 4 illustrates a simplified block diagram of an example VNLS 400 in which load balancing may be performed in accordance with embodiments described herein. As shown in FIG. 4, VNLS 400 includes an ADSC 402 comprising a plurality of data sources 404, such as described above with reference to FIG. 3. Data sources 404 generate data comprising topics 406, which in the illustrated embodiment are provided to a single recorder 408 of a load balancing module 409. Recorder 408 maintains a plurality of links 410 to one or more loggers 412. In particular embodiments, links 410 comprise transmission control protocol (TCP) links terminating in sockets 414 on the loggers.

As will be described in greater detail below with reference to FIG. 5, as an alternative to static connections between topics and links, load balancing module 409 assesses the state of the VNLS 400 at a given time to load balance the topics 406 across the links 410 to optimize use of the network such that data loads are approximately evenly distributed across links 410. Additionally, load balancing module 409 can avoid use of links that are compromised or inoperable for some reason and can further avoid sending data to loggers that have been rendered temporarily or permanently out of commission.

Example Operations for Performing Load Balancing in a VNLS

Figure 5:
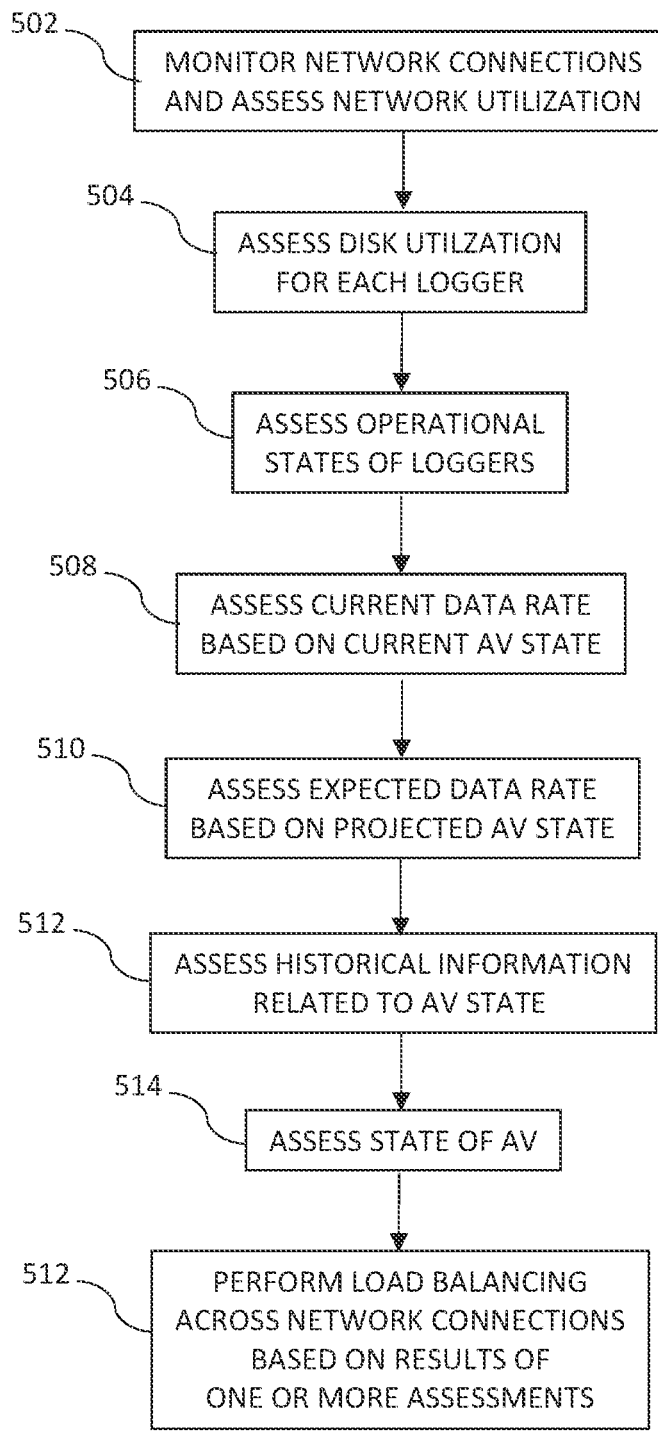
FIG. 5 illustrates a simplified flow diagram of operations according to some aspects of the disclosed technology for performing load balancing in a VNLS including one or more loggers.

FIG. 5 is a flowchart 500 illustrating example operations performed by load balancing module 409 (FIG. 4) in connection with performing load balancing in a VNLS in accordance with embodiments described herein. In certain embodiments, one or more of the operations illustrated in FIG. 5 may be executed by one or more of the elements shown in FIGS. 1-4, for example.

In 502, the status of the network connections may be monitored and network utilization may be assessed as a result of the monitoring. This may involve, for example, monitoring latency of, dropped packets on, and/or other indications of the overall utilization of the network.

In 504, disk utilization for each logger may be assessed. In particular, this may involve assessment of reports from loggers provided to ADSC that detail various disk utilization metrics. Additionally and/or alternatively, CPU and/or RAM usage could be assessed in 504.

In 506, operational states of the loggers may be assessed. For example, one of the loggers may become inoperable for some reason, which condition may be either short- or long-term, in which case topics sent to that logger would not be recorded.

In 508, a current data rate of the network based on the current state of the AV, for example, may be assessed. In particular, a vehicle that is currently operating in an autonomous mode will have a higher data rate than a vehicle that is being operated in a manual mode, given the additional data required to safely operate the vehicle in an autonomous mode. Similarly, a vehicle that is involved in a collision or a near miss will have a higher data rate than a vehicle that is parked, for example, given the amount of additional data necessitated by such an event. Other AV states that may affect the data rate include driving conditions such as the weather in which the AV is currently driving, the geographic area in which the AV is navigating (e.g., urban vs. suburban, highway vs. rural road), and whether there are a significant number of other road participants, such as pedestrians and/or cyclists, for example, in the are in which the AV is being operated. In addition to an overall increase in data rate caused by the aforementioned situations/conditions, particular data sources, such as sensors, will produce data at a higher data rate than others in such situations/conditions. As this data is tied to triggers and further tied to topics, as described above, an assessment may be made as to which data sources in particular may be experiencing a spike in data rate, which information may be mapped to topics and/or triggers for use in performing load balancing of the network.

In 510, taking 508 a step further, an expected data rate of the network based on the projected state of the AV may be assessed based on information from the planning stack (e.g., planning stack 116 (FIG. 1), and/or perception stack (e.g., perception stack 112 (FIG. 1)), for example. In this manner, data rate spikes with regard to particular data sources and associated topics and related triggers can not only be detected but also predicted and the information factored into a load balancing decision (below).

In 512, historical data in connection with the AV in particular and/or other AVs in a fleet of AVs with which the AV is associated, may be accessed (e.g., from local computing device 110 (FIG. 1) and/or data center 150 (FIG. 1)). Such historical data may provide information regarding the data rates (e.g., data spikes and/or dips) associated with particular events and/or vehicle states in the past, which information may be factored into a load balancing decision (below).

In 514, the state of the vehicle itself may be assessed. For example, whether the vehicle is in a degraded state of operation or is the subject of a vehicle recovery event (VRE) may have a predictable impact on data rates, which information may be factored into a load balancing decision (below). Additionally, information from a remote assistance platform (e.g., remote assistance platform 156 (FIG. 1)) regarding an event experienced by the vehicle may further inform an assessment of current and/or expected data rates in connection with topics and/or triggers and may be factored into the load balancing determination (below). Such information may include a response to a remote assistance request from the vehicle, as described above with reference to remote assistance platform 158 (FIG. 1).

In 516, some or all of the information gathered in 502-514 may be used to perform a dynamic load balancing across the network links. It will be noted that various dynamic load balancing techniques may be used to perform this operation, least connection, weighted least connection, weighted response time, and resource-based algorithms.

Although the operations of the example method shown in and described with reference to FIG. 5 are illustrated as occurring once each and in a particular order, it will be recognized that the operations may be performed in any suitable order and repeated as desired. Additionally, one or more operations may be performed in parallel. Furthermore, the operations illustrated in FIG. 5 may be combined or may include more or fewer details than described.

Example Processor-Based System

Figure 6:
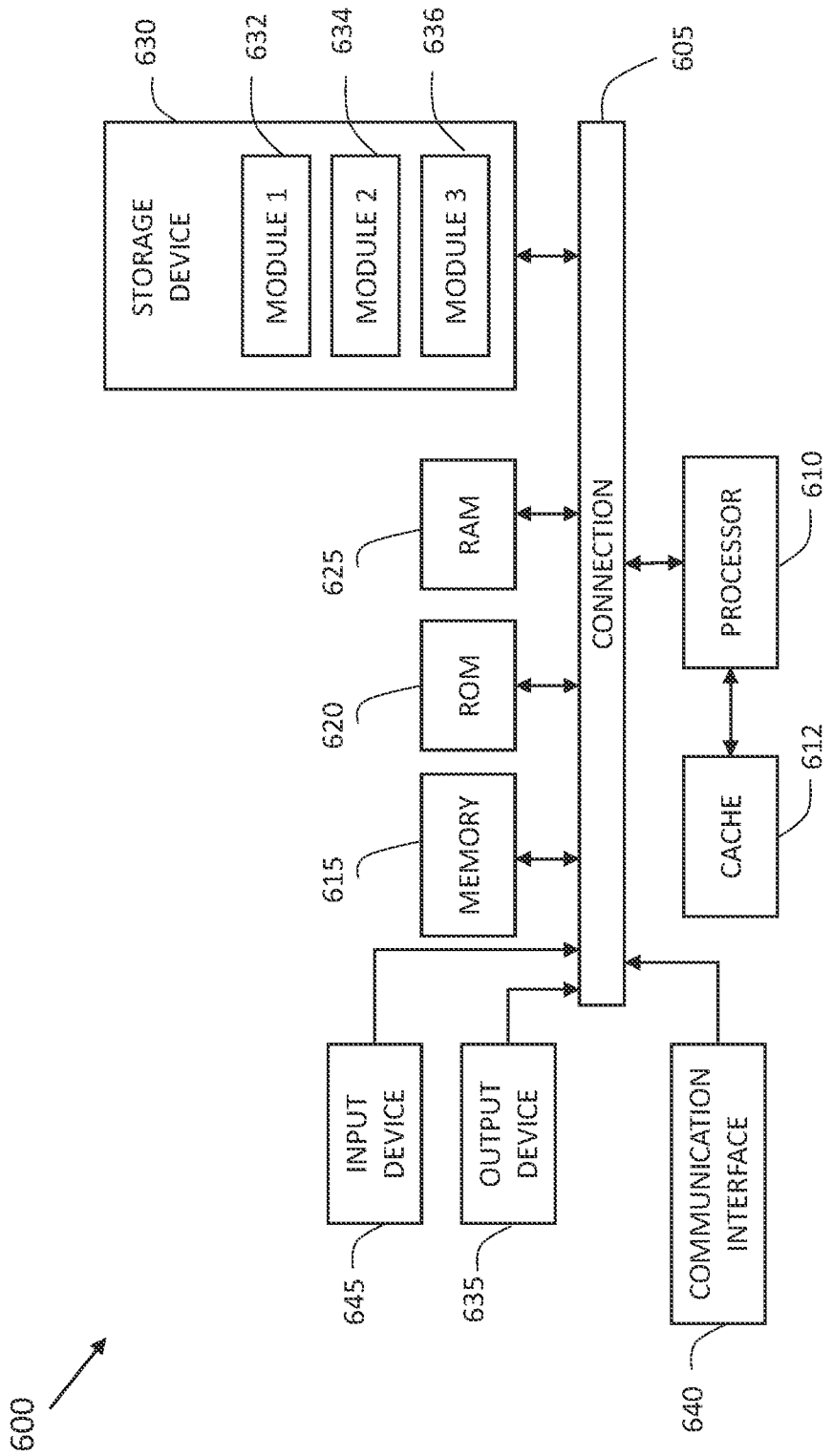
FIG. 6 illustrates an example processor-based system with which some aspects of the disclosed technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special purpose processor where software instructions are incorporated into the actual processor design. One or more of services 632, 634, and 636 may be involved in implementing one or more operations shown and described in FIG. 4. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a USB port/plug, an Apple® Lightning® port/plug, an Ethernet port/plug, a fiber optic port/plug, a proprietary wired port/plug, a Bluetooth® wireless signal transfer, a Bluetooth® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, WLAN signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more GNSS receivers or transceivers that are used to determine a location of the computing system 600 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer-readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid state memory, a Compact Disc Read-Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network personal computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

SELECTED EXAMPLES

Example 1 provides a vehicle network logging system (VNLS) for a vehicle, the VNLS comprising an automated driving systems computer (ADSC) installed on the vehicle, the ADSC comprising a load balancing module; and at least one logger installed on the vehicle, wherein the at least one logger is connected to the ADSC via a communications network comprising a plurality of communications links and wherein the at least one logger receives from the ADSC data for logging in at least one database of the at least one logger, wherein the data is received from the ADSC via the plurality of communications links; wherein the load balancing module performs dynamic load balancing of the data across the plurality of communications links, wherein the dynamic load balancing is performed based at least in part on disk utilization information for the at least one logger and network utilization of the communications network.

Example 2 provides the VNLS of example 1, wherein the data is generated by data sources comprising onboard sensors of the vehicle.

Example 3 provides the VNLS of example 1, wherein the data is grouped into topics associated with events, and wherein the load balancing module performs dynamic load balancing of the data based on at least one of the topics and the events.

Example 4 provides the VNLS of example 1, wherein the dynamic load balancing is performed based at least in part on an operational state of the at least one logger.

Example 5 provides the VNLS of example 1, wherein the dynamic load balancing is performed based at least in part on a current data rate of the ADSC based on a current state of the vehicle as indicated by a perception stack of the vehicle.

Example 6 provides the VNLS of example 1, wherein the dynamic load balancing is performed based at least in part on a projected data rate of the ADSC based on a projected state of the vehicle as indicated by at least one of a perception stack of the vehicle and a planning stack of the vehicle.

Example 7 provides the VNLS of example 1, wherein the dynamic load balancing is performed based at least in part on historical data rates associated with a current state of the vehicle or a projected state of the vehicle.

Example 8 provides the VNLS of example 1, wherein the dynamic load balancing is performed based at least in part on remote assistance data associated with the vehicle.

Example 9 provides the VNLS of example 1, wherein the dynamic load balancing is performed based at least in part on an event involving the vehicle, wherein the event comprises at least one of a collision event, a near miss event, and a vehicle recovery event.

Example 10 provides the VNLS of example 1, wherein the dynamic load balancing is performed based at least in part on driving conditions of the vehicle, wherein the driving conditions comprise one or more of time of day, weather, geographic location, and other road participants.

Example 11 provides the VNLS of example 1, wherein the at least one database comprises at least one of random access memory (RAM) and a persistent memory.

Example 12 provides a method for performing load distribution in a vehicle network logging system (VNLS) comprising an automated driving systems computer (ADSC) installed on a vehicle and at least one logger installed on the vehicle, wherein the at least one logger is connected to the ADSC via a communications network comprising a plurality of communications links, the method comprising assessing disk utilization information for the at least one logger; assessing network utilization of the communications network; and performing dynamic load balancing of data across the plurality of communications links based on the assessed disk utilization information and the assessed network utilization, the data generated by data sources associated with the ADSC for logging by the at least one logger, wherein at least one of the data sources comprises an onboard sensor of the vehicle; wherein the data is grouped into topics associated with events, and wherein the load balancing module is performed based on at least one of the topics and the events.

Example 13 provides the method of example 12, wherein the dynamic load balancing is performed based at least in part on an operational state of the at least one logger.

Example 14 provides the method of example 12, wherein the dynamic load balancing is performed based at least in part on a current data rate of the ADSC based on a current state of the vehicle as indicated by a perception stack of the vehicle.

Example 15 provides the method of example 12, wherein the dynamic load balancing is performed based at least in part on a projected data rate of the ADSC based on a projected state of the vehicle as indicated by at least one of a perception stack of the vehicle and a planning stack of the vehicle.

Example 16 provides the method of example 12, wherein the dynamic load balancing is performed based at least in part on historical data rates associated with a current state of the vehicle or a projected state of the vehicle.

Example 17 provides the method of example 12, wherein the dynamic load balancing is performed based at least in part on remote assistance data associated with the vehicle.

Example 18 provides the method of claim 12, wherein the dynamic load balancing is performed based at least in part on an event involving the vehicle, wherein the event comprises at least one of a collision event, a near miss event, and a vehicle recovery event.

Example 19 provides the method of example 12, wherein the dynamic load balancing is performed based at least in part on driving conditions of the vehicle, wherein the driving conditions comprise one or more of time of day, weather, geographic location, and other road participants.

Example 20 provides one or more non-transitory computer-readable storage media comprising instruction for execution which, when executed by a processor, are operable to perform operations in connection with load distribution in a vehicle network logging system (VNLS) comprising an automated driving systems computer (ADSC) installed on a vehicle and at least one logger installed on the vehicle, wherein the at least one logger is connected to the ADSC via a communications network comprising a plurality of communications links, the operations comprising determining a disk utilization information for the at least one logger; determining a network utilization of the communications network; determining a current data rate of the ADSC based on a current state of the vehicle as indicated by a perception stack of the vehicle; determining a projected data rate of the ADSC based on a projected state of the vehicle as indicated by at least one of a perception stack of the vehicle and a planning stack of the vehicle; and performing dynamic load balancing of data across the plurality of communications links based on the determinations, the data generated by data sources associated with the ADSC for logging by the at least one logger; wherein the data is grouped into topics associated with events, and wherein the load balancing module is further performed based on at least one of the topics and the events.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A method for performing load distribution in a vehicle network logging system (VNLS) comprising an automated driving systems computer (ADSC) installed on a vehicle and at least one logger installed on the vehicle, wherein the at least one logger is connected to the ADSC via a communications network comprising a plurality of communications links, the method comprising:
    assessing, by a load balancing module, disk utilization information for the at least one logger;
    assessing, by the load balancing module, network utilization of the communications network; and
    performing, by the load balancing module, load balancing of data across the plurality of communications links based on the assessed disk utilization information and the assessed network utilization, the data generated by data sources associated with the ADSC for logging by the at least one logger, wherein at least one of the data sources comprises an onboard sensor of the vehicle;
    wherein the data is grouped into topics associated with events, and wherein the load balancing module is performed further based on at least one of the topics and the events.

2. The method of claim 1, wherein the load balancing is performed based at least in part on an operational state of the at least one logger.

3. The method of claim 1, wherein the load balancing is performed based at least in part on a current data rate of the ADSC based on a current state of the vehicle as indicated by a perception stack of the vehicle.

4. The method of claim 1, wherein the load balancing is performed based at least in part on a projected data rate of the ADSC based on a projected state of the vehicle as indicated by at least one of a perception stack of the vehicle and a planning stack of the vehicle.

5. The method of claim 1, wherein the load balancing is performed based at least in part on historical data rates associated with a current state of the vehicle or a projected state of the vehicle.

6. The method of claim 1, wherein the load balancing is performed based at least in part on remote assistance data associated with the vehicle.

7. The method of claim 1, wherein the load balancing is performed based at least in part on an event involving the vehicle, wherein the event comprises at least one of a collision event, a near miss event, and a vehicle recovery event.

8. The method of claim 1, wherein the load balancing is performed based at least in part on driving conditions of the vehicle, wherein the driving conditions comprise one or more of time of day, weather, geographic location, and other road participants.

9. A vehicle network logging system (VNLS) for a vehicle, the VNLS comprising:
   an automated driving systems computer (ADSC) installed on the vehicle, the ADSC comprising a load balancing module; and
   at least one logger installed on the vehicle, wherein the at least one logger is connected to the ADSC via a communications network comprising a plurality of communications links and wherein the at least one logger receives, from the ADSC, data for logging in at least one database of the at least one logger, wherein the data is received from the ADSC via the plurality of communications links;
   wherein the load balancing module performs load balancing of the data across the plurality of communications links, wherein the load balancing is performed based at least in part on disk utilization information for the at least one logger and network utilization of the communications network.

10. The VNLS of claim 9, wherein the data is generated by data sources comprising onboard sensors of the vehicle.

11. The VNLS of claim 9, wherein the data is grouped into topics associated with events, and wherein the load balancing module performs dynamic load balancing of the data based on at least one of the topics and the events.

12. The VNLS of claim 9, wherein the load balancing is performed based at least in part on an operational state of the at least one logger.

13. The VNLS of claim 9, wherein the load balancing is performed based at least in part on a current data rate of the ADSC based on a current state of the vehicle as indicated by a perception stack of the vehicle.

14. The VNLS of claim 9, wherein the load balancing is performed based at least in part on a projected data rate of the ADSC based on a projected state of the vehicle as indicated by a planning stack of the vehicle.

15. The VNLS of claim 9, wherein the load balancing is performed based at least in part on historical data rates associated with a current state of the vehicle or a projected state of the vehicle.

16. The VNLS of claim 9, wherein the load balancing is performed based at least in part on remote assistance data associated with the vehicle.

17. The VNLS of claim 9, wherein the load balancing is performed based at least in part on an event involving the vehicle, wherein the event comprises at least one of a collision event, a near miss event, and a vehicle recovery event.

18. The VNLS of claim 9, wherein the load balancing is performed based at least in part on driving conditions of the vehicle, wherein the driving conditions comprise one or more of time of day, weather, geographic location, and other road participants.

19. The VNLS of claim 9, wherein the at least one database is implemented using at least one of random access memory (RAM) and a persistent memory.

20. One or more non-transitory computer-readable storage media comprising instruction for execution which, when executed by a processor, are operable to perform operations in connection with load distribution in a vehicle network logging system (VNLS) comprising an automated driving systems computer (ADSC) installed on a vehicle and at least one logger installed on the vehicle, wherein the at least one logger is connected to the ADSC via a communications network comprising a plurality of communications links, the operations comprising:
   determining a disk utilization information for the at least one logger;
   determining a network utilization of the communications network;
   determining a current data rate of the ADSC based on a current state of the vehicle as indicated by a perception stack of the vehicle;
   determining a projected data rate of the ADSC based on a projected state of the vehicle as indicated by at least one of a perception stack of the vehicle and a planning stack of the vehicle; and
   performing load balancing of data across the plurality of communications links based on the determinations, the data generated by data sources associated with the ADSC for logging by the at least one logger;
   wherein the data is grouped into topics associated with events, and wherein the load balancing module is further performed based on at least one of the topics and the events.

* * * * *